United States Patent [19]

Winblad

[11] 4,420,167
[45] Dec. 13, 1983

[54] ASSEMBLY FOR STABILIZING A VEHICLE CHASSIS

[76] Inventor: Nils Winblad, Varmlandsvagen 10C, S-691 32 Karlskoga, Sweden

[21] Appl. No.: 346,797

[22] Filed: Feb. 8, 1982

Related U.S. Application Data

[63] Continuation-in-part of Ser. No. 207,489, Nov. 17, 1980, abandoned, which is a continuation of Ser. No. 41,851, May 24, 1979, abandoned.

[30] Foreign Application Priority Data

Jun. 7, 1978 [SE] Sweden ............................. 7806643

[51] Int. Cl.³ ............................................. B60G 19/06
[52] U.S. Cl. ................................... 280/6 H; 172/401; 172/421; 180/22; 180/41; 280/707
[58] Field of Search .................. 180/41, 9.2 R, 22; 280/707, 702, 6 H; 172/4.5, 400, 401, 402, 403, 404, 421

[56] References Cited

U.S. PATENT DOCUMENTS

| 2,247,749 | 7/1941 | De Venel | 280/707 |
| 3,003,783 | 10/1961 | Brueder | 280/707 |
| 3,063,510 | 11/1962 | Hunger et al. | 180/9.2 R |
| 3,124,368 | 3/1964 | Corley et al. | 280/707 X |
| 3,625,303 | 12/1971 | Cameron | 180/9.2 R |
| 3,743,044 | 7/1973 | Scheele | 280/6 H |
| 3,861,696 | 1/1975 | Gustafsson | 280/6 H |
| 3,970,327 | 7/1976 | Dezelan | 280/6 H |
| 4,247,126 | 1/1981 | Claxton | 280/6 H |

Primary Examiner—John A. Pekar
Attorney, Agent, or Firm—Pollock, Vande Sande & Priddy

[57] ABSTRACT

The present invention is directed to an assembly for stabilizing a vehicle supported on at least three pairs of wheels or tracks, wherein various pairs of wheels are selectively connected to one another in bogie style so as to reduce tipping movement of the vehicle chassis as the wheels travel over uneven terrain. A second embodiment of the invention discloses means to control the bogies with respect to their direction of rotative movement. Fluid damping means are provided for some or all of the wheels. These damping means are interconnected with longitudinal and diagonal conduits, with pumps and valves placed to control the movement of the fluid medium between the respective damping means.

20 Claims, 12 Drawing Figures

ASSEMBLY FOR STABILIZING A VEHICLE CHASSIS

CROSS-REFERENCE TO RELATED APPLICATIONS

The present application is a continuation-in-part of pending application Ser. No. 207,489 filed on Nov. 17, 1980, now abandoned, which is a continuation of Ser. No. 041,851 filed May 24, 1979 and now abandoned, by the same inventor as the present application, namely Nils Windblad. It is respectfully requested that the subject matter of application Ser. No. 207,489 be incorporated into the present application by reference thereto.

BACKGROUND OF THE INVENTION

The present invention relates to a device for stabilizing a vehicle, particularly a tracked and/or wheeled combat vehicle having a hydraulic wheel suspension and at least three pairs of wheels, pressure cylinders or corresponding components by means of which the position of the vehicle chassis can be controlled even as the wheels travel over uneven terrain. The pressure cylinders are mounted on the vehicle chassis and are connected with each other via pipes. The vehicle is equipped with gyros or corresponding reference means, such as a pendulum or swing arm with a transducer which emits a signal when a change takes place in the position of the chassis of the vehicle in relation to a reference base.

Certain types of vehicles, primarily tracked and/or wheeled combat vehicles have a driving function and an operating function, e.g. as weapon carriers. For proper operation, it is crucial that disturbances such as unevenness of the terrain have as little effect as possible on the body or chassis of the vehicle as it moves across the terrain. Further, in certain cases there is a requirement that maneuvers be carried out around the tipping axes of the vehicle both when it is driven and when it is stationary, and that the height of the vehicle be controlled in relation to the ground surface.

It is previously known in a hydraulic wheel suspension system that it is possible to achieve multiple functions in various ways; for example, various types of pressure equalizing systems and pump systems can be used to adapt the position of the vehicle to varying terrain. Such known systems have usually been limited to functions such as: providing relatively slow maneuvering over the transversal axis primarily for evaluation of vehicle-fixed weapons in stationary positions; pressure equalizing between a limited number of wheels to achieve stable support of the vehicle; damping of excited over-oscillations around the transversal axis when driving on uneven ground; and changing of the height of the vehicle when in a stationary position (only to a slight extent applied to operating purposes).

Operation of such a hydraulic wheel suspension system is normally carried out with the aid of internal pump units connected to the propulsion machinery. However, as a rule the pump capacity in these units is not adaptable to such rapid and continuous pumping as is necessary to maintain a stabilized and controlled tipping position laterally and longitudinally when driving, independent of the ground surface over which the vehicle travels.

SUMMARY OF THE PRESENT INVENTION

The main purpose of the present invention is to create a device for stabilizing a vehicle in the tipping axes (the longitudinal and/or transverse directions of the vehicle) for vehicles having internal pump units with limited pumping capacity. In a further development of the concept of the invention, it is also possible to control the vehicle both when it is in motion and when it is stationary, wherein means for controlled damping at several of the wheels of the vehicle are used together with the new stabilizing device.

In further embodiments of the concept of the invention, the new stabilizing device permits a choice between a number of driving modes with consideration to obstacles in the terrain, the task to be accomplished by the vehicle, etc. Likewise, pressure equalizing between the wheels on uneven terrain can be achieved in the system of the present invention without need to measure the inclination of the swing arms of the wheels with synchros or the like. Particularly in the case of tracked combat vehicles, a heavily loaded end road wheel, e.g. when driving up an incline, is given an increased mean pressure which compensates for the pressing-up force at the rear end wheel.

The more concrete implementation of the concepts upon which the invention is based is achieved in a basic embodiment of the invention, wherein pipes connecting the pressure cylinders are arranged with shut-off or by-pass valves which can be controlled by signals from a gyro. This permits a transfer of medium between the pairs of wheels from a pressure cylinder in the first pair of wheels to a pressure cylinder in the second pair of wheels, which is located on the same side of the third pair of wheels as the first pair of wheels. This, in turn, causes the first and second pairs of wheels to enter into a coaction in the form of a bogie arrangement which counteracts the change of position of the vehicle chassis relative to the reference base.

BRIEF DESCRIPTION OF THE DRAWINGS

Embodiments proposed in the present invention which have the characteristics significant for the invention will be described in the following, with reference to the accompanying drawings, in which.

DETAILED DESCRIPTION OF A BASIC EMBODIMENT

The new stabilizing device of the present invention is based upon the knowledge that when a vehicle has three pairs of wheels and two of the pairs of wheels are connected together in a bogie function, the vehicle body or chassis will react to changes in the inclination of the terrain with a certain time lag if the bogie at each and every moment is correctly placed on the vehicle. If, for instance, the front pair of wheels is connected in a bogie function to an intermediate pair of corresponding wheels and the vehicle tips forward over an edge, the time lag will last as long as the swing arm of the bogie has the same turning movement in relation to the chassis as the chassis has in relation to a reference base, which usually constitutes a horizontal plane. When the turning movements in the swing arm of the bogie and the chassis show opposite signs, as may occur after a period of time, the time lag will cease and the inclination of the chassis will again approach the inclination of the terrain. However, in accordance with the concept of the invention, the vehicle is stabilized so that the time lag is made permanent with the chassis in its most favourable orientation relative to the reference plane. It is, moreover, desirable that the time lag be continued by altering the bogie arrangement between the individual pairs of wheels in a certain, predetermined manner. This is possible in the hydraulic system according to the invention wherein, the bogie arrangement is rapidly achieved by means of valves located at various positions on a vehicle, with consideration to current requirements dictated by changing terrain.

FIGS. 1a–1e are intended to show an embodiment of the present invention employing a hydraulic system for stabilizing a vehicle chassis mounted on a plurality of wheels. In the figures, the chassis of the vehicle is designated by the numeral 1. The vehicle is equipped with three pairs of wheels, with a single wheel of each pair represented by wheels 2, 3 and 4, respectively. Each wheel in each pair of wheels rests via a separate swing arm 5, push rod 6 and piston 7 against a pressure medium 8 in a fluid suspension system or pressure cylinder 9. Six pressure cylinders 9, of which three are shown, are preferably mounted on opposite sides of the vehicle chassis 1 and are connected with each other via pipes 10 and 11 into first and second bogie systems. First and second bogie systems are arranged on each side of the vehicle chassis. Each pipe 10 connects the fluid suspension system or pressure cylinder for one of the wheels 2 with the adjacent fluid suspension system or pressure cylinder for one of the wheels 3. Each pipe 11 connects the pressure cylinder for one of the wheels 2 with the adjacent pressure cylinder for one of the wheels 4. Separate shut-off valve means 12 and 13 are arranged in each of the pipes 10 and 11, respectively, with actuation of the shut-off valves being controlled by a control unit 14, as will be explained in detail hereinafter.

Figure 1A:
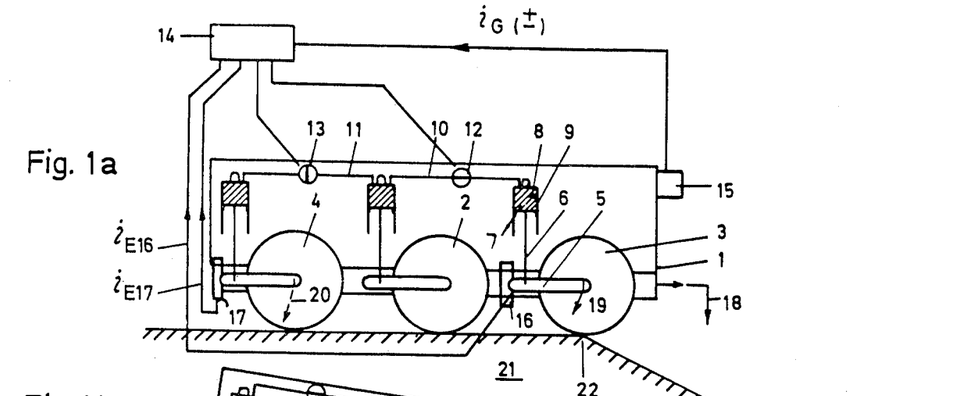
FIGS. 1a–1e show in principle the functions necessary for stabilizing a vehicle.
Figures 1B, 1C:
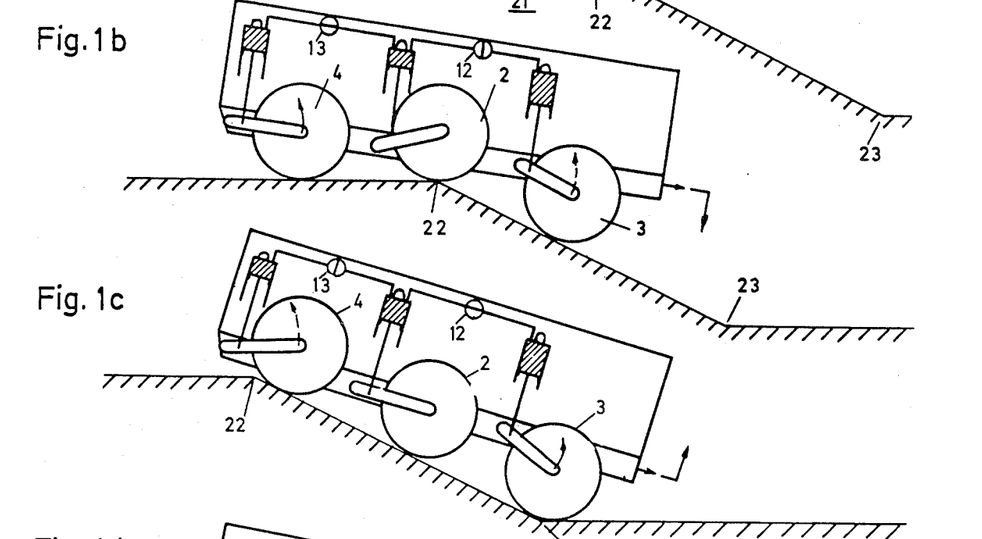
Figure 1D:
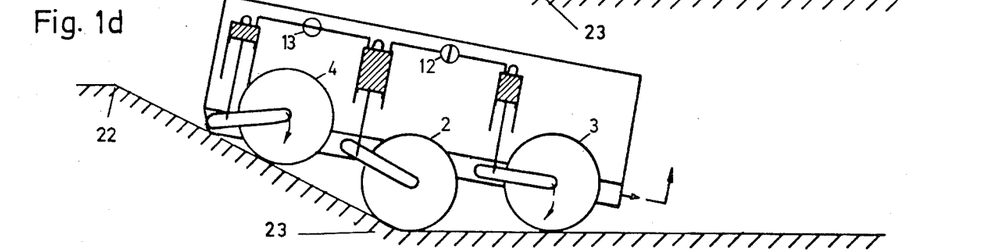
Figure 1E:
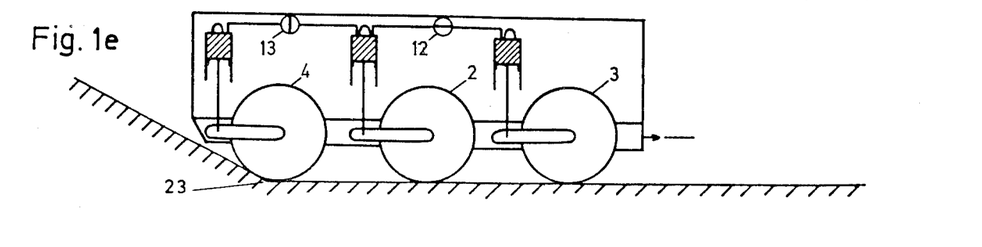

As shown in FIG. 1a, shut-off valve 12 is in an open position and shut-off valve 13 is in a closed position. For purposes of this explanation only, it can be assumed that the position of the valves, cylinders and swing arms for the additional wheels 2, 3 and 4 (not shown) is identical to the three wheels shown in FIGS. 1a–1e. These positions have been initiated by the front wheels entering the slope as they pass over the change of gradient 22, chosen for purposes of explaining the operation of the present invention. Through selective opening and closing of each pair of valve means 12 and 13, the flow of a fluid through each pair of pipes 10 and 11 can be controlled so as to control the movement of the six pistons 7 and the six swing arms 5 respectively attached to both the pistons 7 and pairs of wheels 2, 3, 4. By selective movement of the pairs of valves 12 and 13 mounted on each side of the vehicle chassis between open and closed positions, it becomes possible to create a first bogie function between wheels 2 and wheels 3 or a second bogie function between wheels 2 and wheels 4, respectively.

A gyro assembly 15 is attached to vehicle chassis 1 and serves to provide a signal iG($\pm$) indicative of rotative movement of chassis 1 about its transverse axis. In other words, gyro 15 senses longitudinal upward and downward tipping movement of chassis 1 as may occur when the vehicle travels over uneven terrain. Gyro 15 measures the angular velocity of the chassis 1 about its transverse axis as well as determining when the chassis 1 is out of stable balance relative to a chosen reference plane. In particular, gyro 15 provides a rate signal indicative of the angular velocity of chassis 1, the signal having positive sign (+) as chassis 1 rotates in a counterclockwise direction and a negative sign (−) as chassis 1 rotates in a clockwise direction about a transverse axis extending perpendicular to the longitudinal axis of the vehicle. It is noted that the particular signs chosen for specific rotation movements of the chassis can, of course, be reversed if desired.

Gyro 15 also provides an angular position signal which may take a positive sign when the forward end of the vehicle, the end to which the gyro 15 is attached in FIG. 1a, is inclined upward and may take a negative sign when the forward portion of the vehicle is tipped downward relative to a predetermined reference place. For purposes of explanation only, it can be assumed that the predetermined reference plane extends parallel to substantially flat terrain. As a result, the angular position signal of gyro 15 may have a zero value when the vehicle chassis and attached gyro 15 assume predetermined zero inclination compared to the same predetermined reference plane. As will become clear, the angular position signal allows the vehicle chassis to be automatically reset to the zero inclination of the reference plane after a specified delay dependent on the immediate terrain under the vehicle and the magnitude of the angular position signal generated.

Turning again to FIGS. 1a–1e, rotating movements of the four swing arms 5 attached to the front and rear pairs of wheels 3 and 4 are sensed by means of transducer means which include 16 and 17, respectively, with each transducer means being arranged at a supporting shaft of its respective swing arm 5. Transducer means 16 emit a signal $i_E16$, while transducer means 17 emit a signal $i_E17$, respectively, with each of the transducer means generating signals having signals directly dependent on the direction of rotative movement of the particular swing arm monitored by the respective transducer means. The transducer means may, for example, comprise synchros. In the basic embodiment a positive signal $i_E16+$ may indicate counterclockwise rotation of the swing arm 5 attached to a wheel 3, while a negative signal $i_E16-$ indicates clockwise rotation of the same swing arm 5. Likewise, counterclockwise rotation of the swing arm 5 attached to a wheel 4 generates a positive signal $i_E17+$, while clockwise rotation of the same swing arm 5 generates a negative signal $i_E17-$. It is assumed in this embodiment that the movement of the wheels is the same on both sides of the vehicle, therefore the two transducer means 16 and 17 shown in FIG. 1a are sufficient to provide signals indicative of the movement of each pair of wheels 3 and 4. However, it is considered within the scope of the present invention to employ a pair of transducer means 16 and 17 on each side of the vehicle to measure the rotative movement of the swing arms 5 attached to both of the wheels 3 and 4.

The embodiment will then have to extend into a more complex configuration, incorporating some of the features that will later be explained in conjunction with a second embodiment.

Figure 5:
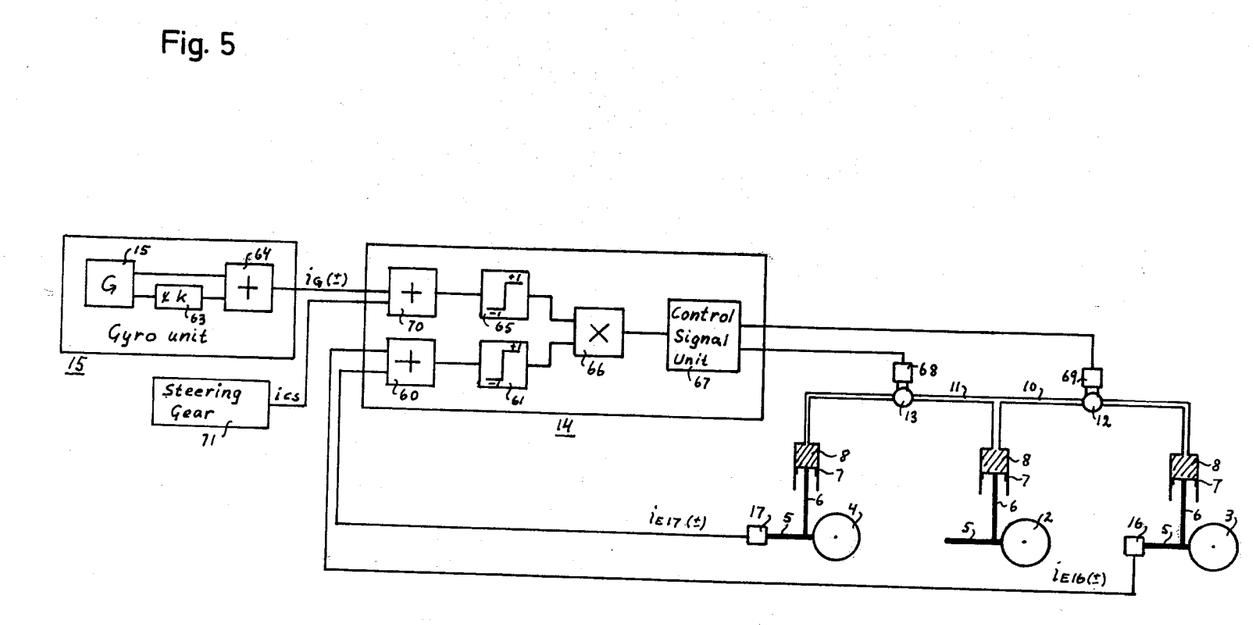
FIG. 5 shows a schematic representation of the control unit employed in the embodiment of FIG. 1.

Signals $i_E16$ and $i_E17$ emitted by transducer means 16 and 17 as well as the two signals emitted by gyro 15 are all fed into control means 14, shown in schematic form in FIG. 5. Control means 14 includes a summing member 60 which receives and sums signals $i_E16$ and $i_E17$ with regard to both sign and size. Member 60 emits a summation signal $i_E16+17$ which is fed into a digital converting member 61, wherein the summation signal $i_E16+17$ is converted into a digital signal having a value of $+1$ or $-1$ dependent on the sign or letter of the incoming summation signal being plus or minus.

Gyro unit 15 also includes a summing member 64 which receives an angular velocity signal transmitted by gyro 15. Summing member 64 also receives a further signal from a member 63, with member 63, in turn, connected so as to receive the angular position signal transmitted by gyro 15. The angular position signal is multiplied by a predetermined constant while passing through member 63, with the output signal from member 63 being fed into summation member 64. The two signals entering member 64 are summed with regard to both sign and size. A summation signal $i_G$ is transmitted from member 64 to a digital converting member 65 where it is converted into a digital signal having a value of $+1$ or $-1$ dependent on the signal of the summation signal emitted by member 64.

The digital signals emitted by members 61 and 65 are each fed into a multiplying member 66 wherein the signals are multiplied to produce a resultant product signal $i_{RS}$ which can be either positive or negative in sign. The resultant product signal $i_{RS}$ emitted by member 66 activates a conventional electrical current generating unit 67 which, in turn, provides an adjustment current to servo actuators 68 and 69, respectively. Servo actuator 68 is attached to each rear valve 13, while servo actuator 69 is attached to each front valve 12. The position of the valves 12 and 13 is of no significance when the vehicle is travelling over flat terrain. For purposes of explanation only it may be assumed that servo actuators 68 and 69 are each initially biased to a first position wherein the attached valves 12 are closed and 13 are open. The valves will then change positions under the influence of the ground encountered in a manner that will later be explained with respect to FIG. 1a-1e.

During operation, a positive resultant signal ($+i_{RS}$) fed into unit 67 generates adjustment currents in the lines joining servo actuators 68 and 69. These actuate the servo actuators to move front valves 12 to their open positions and rear valves 13 to their closed positions. Likewise, if a negative resultant signal ($-i_{RS}$) is fed into unit 67, adjustment signals are transmitted to actuate the servo actuators which, in turn, move front valves 12 to their closed positions and rear valves 13 to their open positions. In this manner, a bogie is at each time achieved in a position in the vehicle, where it is best suited to reduce the angular deflection of the chassis.

Referring again to FIG. 5, it is noted that a further input to unit 14 can be provided, wherein a command signal $i_{CS}$ indicative of the position of a steering gear 71 is fed into a summation member 70 which also receives the signal $i_G$ from summation unit 64. As the two signals pass through summation unit 70 they are added and the resultant signal is fed into digital converter 65.

In summary, when the swing arms, either the front or rear one, tip in the same direction in relation to the vehicle body as the vehicle body in relation to the ground (the gyro plane) the bogie coaction should be at the front of the vehicle in the driving direction. In the case illustrated in FIG. 1a, when tilting forwards commences, the wheels 2 and 3 on the front end of the vehicle are to be connected together in bogie coaction while wheel 4 is to be separated. This is achieved by opening valve 12 and closing valve 13. The common direction of movement of the vehicle chassis and the front and rear swing arms is indicated by the arrows 18, 19, and 20. On the other hand, when the swing arms and vehicle body have opposite directions of tipping movement, the bogie coaction is reversed with the single wheel foremost in the driving direction. As an exception to this rule, the angular position signal from the gyro 15 will inhibit the damping effect when the corrective angular movement induced on the vehicle chassis by the ground is slow. In the example shown in FIGS. 1a-1e and particularly 1c-1e, this should be assumed not to be the case.

The vehicle illustrated in FIG. 1a is assumed to be driving towards the right on a hypothetical base 21 with two changes of gradient 22 and 23. When the wheels pass over these changes of gradient (1a-1e), valve reversals are obtained and the bogie coaction is reversed. This results in a pumping into or transmission of the fluid medium between the pressure cylinders in such a way that the inclination or tilting of the vehicle along the base is damped. Provided rapid valve reversals are achieved, the function will remain the same when driving on uneven ground. When driving on entirely smooth ground, the equilibrium is constant, and the position of the valves is not significant.

While the system has been illustrated with a transducer means 16 and 17 which take the form of transducer means on swing arms 19 and 20, it should be noted that any means for providing a feed-back for relative wheel motion could be used. For example, the transducer means could be located anywhere in the suspension system 9 wherein the relative motion of the wheel would provide a positive or negative signal that would be indicative of the direction of wheel movement at that time. So long as the control means is responsive to the uneven terrain, it will combine that response with the gyro output to selectively alternate the first and second bogie systems as needed to respond to uneven variations in the terrain.

The above described functioning of the system in a vehicle with three pairs of wheels can be achieved also in a vehicle with more than three pairs of wheels. The wheels will then have to be arranged with a single wheel and a longer bogie or in a short and a long bogie shifting places with each other in a similar manner as the single wheel and the two wheel bogie on each side in the above described embodiment.

Figure 2:
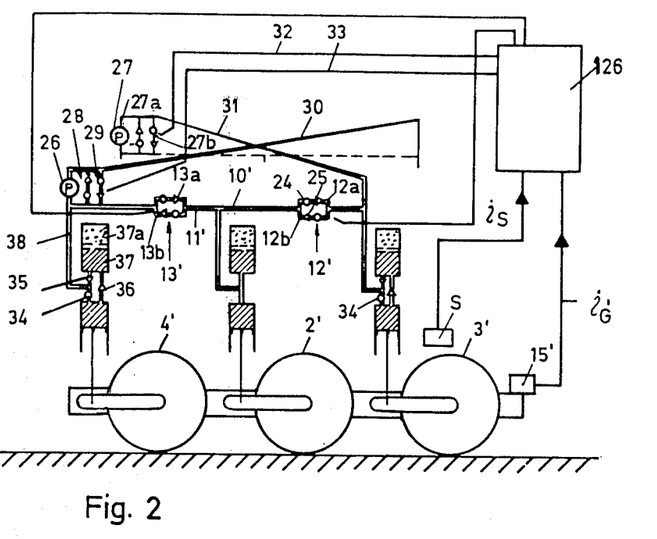
FIG. 2 shows in principle the functions necessary for stabilizing and operating a vehicle in a modified embodiment.
Figure 3A:
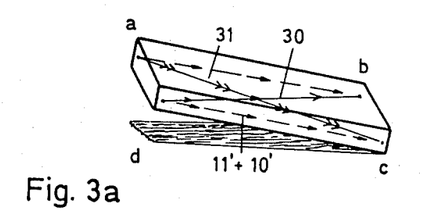
FIGS. 3a–3c show in principle the flow directions in different cases for the vehicle constructed according to FIG. 2.
Figure 3B:
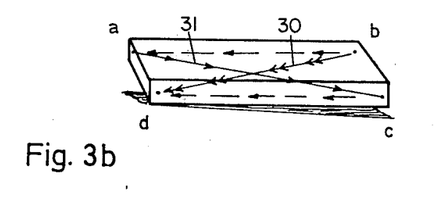
Figure 3C:
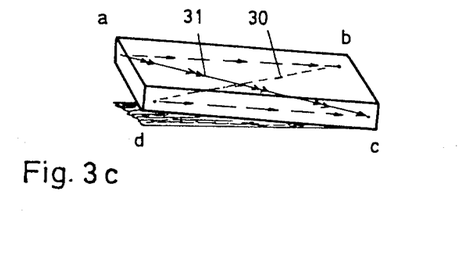
Figure 4:
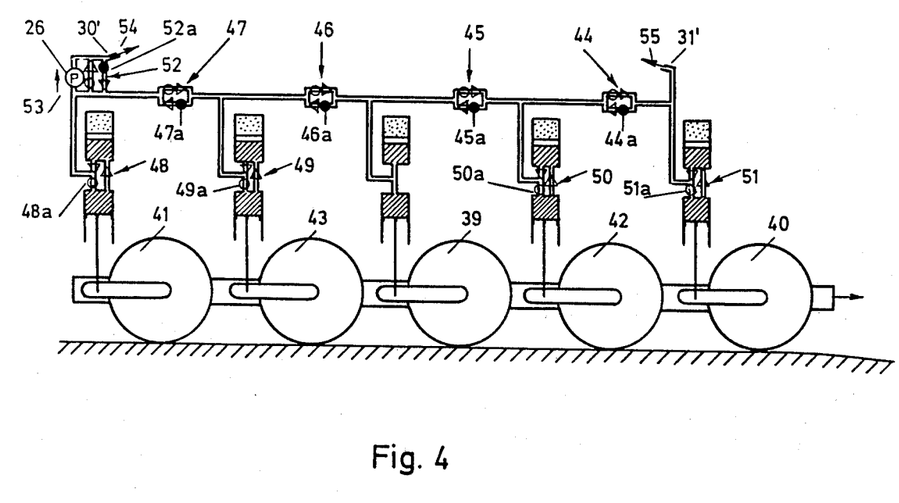
FIG. 4 shows in principle the functions necessary for stabilizing and operating a vehicle in a further modified embodiment.

In the embodiments illustrated in FIGS. 2-4, the transducer means are not required and the system functions by means of gyros only, controlling a modified set of valves.

DETAILED DESCRIPTION OF THE SECOND EMBODIMENT

FIG. 2 illustrates a vehicle which, in principal, functions in a manner similar to the vehicle illustrated in FIGS. 1a–1e, but which had been modified with respect to valve means 12 and 13 and the feed-back synchros 16 and 17. It has been equipped with an internal pumping system, a device for controlling damping of the front and rear wheels, and spring devices at each wheel.

In this embodiment, the valve means comprises two parallel branches or bogie conduits 12a, 12b and 13a, 13b, respectively. In each of the respective branches there are arranged shut-off valves and one-way valves with the one-way valve in one of the branches having a direction opposite the one-way valve in the other branch. In FIG. 2, the shut-off valve in one branch of the valve 12' has been designated 24, while the one-way valve in the other branch has been designated 25. It will thus be obvious that if the shut-off valve is open in one of the branches and closed in the other branch, a flow of medium can take place in the direction desired through the valve means 12'. If the shut-off valves of both branches are open, the fluid medium can flow in both directions through the valve means 12'. The same applies to the valve means 13'. The by-pass valves thus have the function of non-return valves for this embodiment of the valve means.

The control by-pass valves in the pipes between the pressure cylinders are then controlled by means of a control means 126 which corresponds to control means 14 illustrated in FIG. 1a. The control valves 12' and 13' provide four different flow modes for the system: First a flow in the forward direction only in both valves simultaneously; second, a flow in the rearward direction only in both valves simultaneously; third, a free flow both forward and rearward in both valves simultaneously; and fourth, no flow at all in either valve. For the normal functioning of the system, control means 126 controls the setting of the valves for the two first-mentioned modes only.

The two first-mentioned valve positions give a damping function against tipping of the vehicle forward and rearward, respectively. The valve positions which give free flow both forward and rearward can be used to limit the pumping when end wheel swing arms reach their angular end limits. The valve positions which prevent any flow at all through the valves correspond with the driving mode with limited stabilizing, which is achieved only through internal pumping and control damping. This mode of driving can be appropriate when driving on ground with great differences of height levels within the contact length of the vehicle, or when passing obstacles where the vehicle is supported by only a few wheels at a time.

The two last mentioned modes are optional as they are not used for the basic functioning of the system. The control of these modes can be achieved through extensions from the control means 126 to special devices such as circuit closers or switches (not shown) positioned, for the third mode (free flow) at upper and/or lower tipping end positions of the front and rear swing arms and permitting closed valves to be set open by overriding of the original commands from the control means 126, for the fourth mode as a hand switch at the vehicle driver's station, permitting open valves to be set closed by similar overriding commands. These overriding functions can also be imposed directly at the valve actuators without the commands having to interfere with the original circuitry of control means 126.

Figure 6:
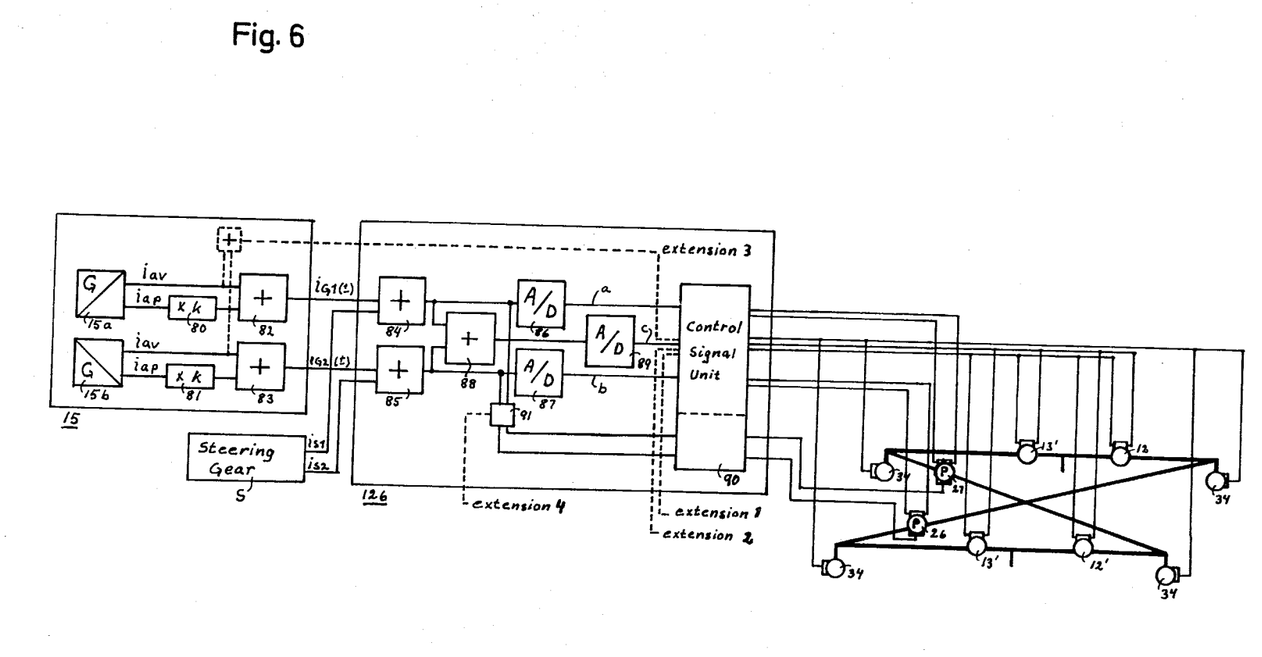
FIG. 6 shows a schematic representation of the control unit employed in the embodiment of FIG. 2.

Through the design of the by-pass valve means illustrated in FIGS. 2 and 6, the reversing criteria can be simplified. It is not necessary to measure the movement of the pendulum arms as illustrated in the embodiment described in FIGS. 1a–1e. Therefore no synchros or transducers are required for this embodiment. The valve means are controlled by a gyro signal $i_G$, with possible modifications from a signal $i_S$ from an optionally connected steering gear indicated in FIG. 2 as S. However, it is considered within the scope of the invention to combine the teachings and feedback devices of the embodiment illustrated in FIG. 1 with the pump and valve means of the embodiment illustrated in FIG. 2, and use both together. The non-return valve function of the by-pass valves also gives the vehicle different spring constants for the different wheels, depending on their positions and the tilting movements of the vehicle. This design also has a damping influence on tilting.

The pumping system illustrated in FIG. 2 comprises two hydraulic pumps 26 and 27 connected in parallel with controllable by-pass valves 28, 29 for each pumping direction and diagonal conduits 30 and 31 which connect the corner wheels of the vehicle in two separate diagonal systems. The pumps are connected to the driving machinery (not shown) of the vehicle. Because of the various valve configurations used in the invention, the pumping capacity of the pumps can be kept low. The by-pass valves 28, 29 comprise a shut-off valve and a one-way valve that function in a manner similar to valves previously described with respect to valve means 12' and 13'. Control of the by-pass valve means 28, 29 as well as the pumping directions can take place from the control means 126 via electrical leads symbolized by 32 and 33. By controlling the pumping direction and pumping speed (the latter being an optional function not necessary in all applications) in the two pumps, controlled tipping movements can be carried out over both the transverse and longitudinal axis of the vehicle. This pumping can also take place through the by-pass valves only, and the pumping work is then carried out by the pressure cylinders in a similar way along the sides of the vehicle.

The device for controlled damping of the respective downward movement of the wheels is illustrated in FIG. 2. Devices for such controlled damping are previously known. Its purpose is to adapt the damping capability of the respective wheel to the movement ratio between the wheel, the chassis, and the ground. It also prevents pushing forces from the wheel from arising and amplifying the tilting movement of the vehicle. In FIG. 2, the device for controlled damping is represented by a damping means for wheels 3' and 4'. Corresponding means are arranged on the respective pairs of wheels on the opposite side of the vehicle. The respective damping means comprises valves arranged in two parallel branches. In the first of said parallel branches there are arranged a reduction valve designated 34 and a one-way valve designated 35. In the other parallel branch there is arranged a one-way valve 36 which is directed opposite to the direction of the one-way valve 35. Spring means 37 is arranged for each of the respective wheels with two parallel branches connecting the pressure cylinder of the wheel with the spring means 37. Spring means 37 comprises a space for oil, a space 37a for gas, and a movable piston separating said spaces. The pumping system for the vehicle is connected to the damping means via pipe 38 to the first of the parallel branches between valves 34 and 35. The reduction valve 34 of the damping means of the wheel is normally controlled by the control means 126, as will be hereinafter described. By selectively throttling valve means 34, a controlled amount of damping may be achieved for each of the wheels. The compressability of the oil-gas mixture 37a provides a resilience for the damping means and this resilience is added to the system in direct proportion to the flow permitted through valve means 34. The damping means previously described, the pressure cylinders 9, and the swing arms 19 and 20 thereby comprise a hydraulic suspension system for each of the wheels 2-4.

The pumping system, the hydraulic suspension system, the pumping direction, the pumping speed and setting positions of the by-pass valves are determined by the inclination movements of the vehicle, measured with gyros. A first gyro can be provided for tilting or movement in the longitudinal axis and a second gyro for tilting or moving in the transverse axis. Alternately, it is possible to orient the gyros for each diagonal direction, which solution has been applied in the described embodiments. The first and second gyros have been given common designations 15' in FIG. 2, and are separately illustrated in FIG. 6. The operation of the hydraulic system illustrated in FIGS. 2 and 6 will be illustrated in FIGS. 3a-3c in which the vehicle chassis has been symbolized by a parallelepiped which is tipped in various directions. The corners of the vehicle have been indicated by a, b, c, and d. The corners b and c are located in the forward direction of the vehicle. The arrows 3a-3c shown in the figures on longitudinal sides of the vehicle and along the diagonals indicate the flow in pumping directions for each of the figures. Particularly, as regards the diagonals, double arrows indicate a greater inclination and a higher pumping speed (when variable pumping speeds are featured) than shown by single arrows. The dash diagonal in FIG. c indicates that there is no flow in the diagonal in that figure.

In FIG. 3a, the vehicle is inclined forwards and towards the right. Diagonals 30 and 31 have the same degree of longitudinal inclination but have different degrees of diagonal inclination. Both the pumps 26 and 27 are pumped forward, but with different speeds. The by-pass valves and the diagonals, e.g. 28, 29 for the diagonal 30 follow the pumping direction, while the valve means and bogie conduits 10', 11' along the sides follow the flow direction longitudinally of the most inclined diagonal which is 31.

In FIG. 3b, the figure is inclined rearward and towards the right, but the corner a is located higher than the corner c. Diagonals 30 and 31 have different directions of inclination and therefore different pumping directions and pumping speeds. The flow along the sides in the bogie conduits follows the longitudinal direction of the most inclined diagonal which is diagonal 30.

In FIG. 3c, the vehicle is inclined forward and towards the right. However, the diagonal 30 does not have any inclination, and therefore the pump in this diagonal is not pumping. In this case the by-pass valves could be open in either direction. But pumping takes place from the corner a to the corner c, the equilibrium over the diagonal between the corners b and d soon ceases, and the system will then equalize as illustrated in FIGS. 3a and 3b.

The control means 126 illustrated in FIG. 2 is more fully described with respect to FIG. 6. In FIG. 6 the gyro unit 15 comprises two gyros 15a and 15b which are oriented along the diagonal lines of the chassis corresponding to conduit means 30 and 31. The output of gyros 15a and 15b provide an angular velocity signal and an angular position signal. The angular velocity signal is indicated by $i_{AV}$ for both gyros 15a and 15b while the angular position signal is indicated by $i_{AP}$ for both gyros. The angular position signal is multiplied with a constant by circuit means 80, 81 and the product is added with the angular velocity signal in summing members 82 and 83. The gyro means 15 thereby provides output $i_G1(\pm)$ and $i_G2(\pm)$ that bear a predetermined algebraic relationship to the angular state of the vehicle chassis. This circuitry is intended to compensate for inclinations in the vehicle orientation imposed by the ground and, through the signals $i_{AP}$ and $i_{AV}$ in combination, to determine a variable angular speed restriction for all corrective angular tilt movements of the vehicle. This means that the vehicle is for instance able to stabilize for a general slope encountered, while still providing compensatory signals for the uneven terrain encountered in the slope.

Command signals may also be combined with the output of the gyro unit through the steering gear command box S in FIG. 6. These command signals $i_S1$ and $i_S2$ are combined with the gyro output signals $i_G1(\pm)$ and $i_G2(\pm)$, respectively in summation units 84 and 85. As was indicated previously with respect to FIG. 5, in operation of the device, angular velocity signals $i_{AV}$ are position (+) as the chassis rotates in a counterclockwise direction and negative (−) as the chassis rotates in a clockwise direction around each of the respective axis and angular position signals $i_{AP}$ are positive (+) as the chassis is inclined upward at its front end and negative (−) as the chassis is tilted down at its front end relative to a reference level. The summed products of member 84 and 85 are converted to digital signals a and b by means of analog-to-digital converters 86 and 87. The output from summation devices 84 and 85 is also combined in summation member 88 and its product is also converted to a digital output signal c by means of analog-to-digital converter 89.

The digital output signals a and b control via the control signal unit 90 the pump directions and by-pass valve means for each of the diagonal conduits 30 and 31. The combined digital signal c controls via the same control signal unit the various valve means 12', 13' in each of the respective bogie conduits 10' and 11'. At positive signals, the digital converters 86 and 87 activate the valves through the control signal unit 90 to provide for a flow of the fluid suspension medium backwards, or to the left, as illustrated in FIG. 6. Any flow in the contrary direction is prevented by the stop valves in valve means 12', 13' and in the corresponding valves in the diagonals. For negative signals provided to the digital conversion units 86 and 87, the control signal unit 90 will reverse the flow and provide a flow toward the front of the vehicle or to the right as illustrated in FIG. 6.

As earlier mentioned, the diagonal pipes can have opposite longitudinal flow directions to each other at one given moment, whereas the flow directions of the pipes along the vehicle sides are equal to each other, following the flow direction of the most inclined diagonal pipe, as determined through members 88 and 89 when the signals from members 84 and 85 are of different signs.

Referring again to FIGS. 2 and 6, the control means 126 does, for the normal functioning of the system, control the setting of the valves for the two first mentioned modes only. Occasionally and especially in conjunction with safety measures and safety devices, also the other two modes of the valves may be needed. So can e.g. the mode of free flow in both directions be used to prevent a continued pumping against the springs when driving up or down a slope steeper than the maximum tilt angles of the vehicle. By the use of micro switches at the angular end limits of the swing arms at the front and rear road wheel stations, overriding commands can be given to the servo actuators at valves 12' and 13', so that these can be set open in both directions simultaneously the time any of the micro switches are actuated, despite the original, suppressed commands from the control means 126. This particular safety measure can also be achieved by a simple shifting between the first two modes by means of the same kind of micro switches, either by an input directly to the servo actuators or through the control means 126. Also hydraulic/mechanical safety devices can be provided as a substitute for the free flow mode.

The fourth mode, no flow in any direction, corresponds to a mode of suspension that is very similar to a normal spring suspension. In such a system the suspension units are isolated from each other and the whole suspension is generally stiffer than in an interconnected system. The fourth mode therefore is especially suited when the vehicle is crossing obstacles where most of the suspension work is loaded on a few road wheels at a time.

Also this mode can be applied for a safety measure. If a hydraulic leakage appears somewhere in the suspension system, an immediate measure needed, is that each unit in the system be isolated, to prevent the whole system to run flat and to permit the leakage to be located. To achieve this, the fourth mode can be applied either through a hand switch overriding the original commands from the control means 126 in a similar way as described for the third mode and applied not only for the valves 12' and 13', but also for the valves in the diagonals, or through specially applied pressure sensitive switches located at certain places on the interconnecting pipes of the suspension system.

The means described with reference to the valve modes three and four are optional as they may not be necessary for all applications of the invented assembly. They are therefore not shown in detail in Figures but indicated by the dashed extensions 1 and 2 of the control signal unit 90, FIG. 6.

As was previously described with respect to the damping means for the hydraulic suspension system, vehicle oscillations can be substantially damped by means of reduction valves 34 located in the suspension system of each of the end wheels as illustrated in FIG. 2. The valve 34 has two positions corresponding to a high and a low rate of damping obtained through narrow passages that are different in size. The valves can be connected to and actuated through the same electrical leads as the valves 12' and 13', so that rear valves 34 are set for a higher rate of damping and the front valves 34 for a lower rate of damping when the valves 12' and 13' are set for flow from the rear to the front and the opposite, front valves 34 set for a higher rate of damping and rear valves 34 for a lower rate of damping when the flow direction through valves 12' and 13' is reversed.

Other criterions can also be used for the control and use of the dampers, e.g. a minimum rate of angular deflection of the chassis under which deflection a high rate of damping is inhibited. This criterion could be achieved through an extension 3, FIG. 6, from gyro signal components $i_{AV}$ or from accelerometers (not shown). It is furthermore possible to use valves with a continuously variable damping function in the place of valves 34. This will, however, like the use of other criterions for the dampers need a further development of the control circuitry, such as indicated by the dashed extension 3, FIG. 6 and the separate connections from the control signal unit 90 to the valves 12' and 13' and to the dampers 34 respectively.

The pumps 26 and 27 are controlled by commands from the control signal unit 90 which provides control for both the pump and its associated by-pass valves.

As was hereinbefore explained with respect to FIG. 3a-3c, various pump rates in forward and reverse modes can be provided, with the highest pump rate being provided in the diagonal with the greatest degree of inclination. Referring to FIG. 6, this would be accomplished by the use of the analog signals emitted from member 84 and 85 indicative of a residual pump capacity need, the external pumping being in action at a capacity that is determined by the ground influence on the wheels when driving. The analog signals are each used to control the pumping speeds of the pumps 26 and 27 in proportion to the respective analog signal, or according to any other curve of interrelation, by means of the Control Signal Unit 90. For various reasons it can be desirable not to use any internal pump capacity at all. This would apply when e.g. the external pumping is sufficient for the stabilisation needed. The pumps could then be inactivated by a cut-off switch indicated by member 91. An extension 4 of the switch could be located at the driver's station or be connected to any feasable, automatic criterion device needed (not shown). The pumping direction is as before mentioned monitored in parallel with the by-pass valves in the respective diagonals by the digital signals from the members 86 and 87 through Control Signal Unit 90.

The valve by-pass systems adjacent each of the pumps 26 and 27 function in a manner similar to valve systems 12' and 13'. Each has four states available; with the first being a flow in the forward direction only; the second a flow in the rearward direction only; the third a free flow and; the fourth providing for no fluid movement, except that which flows through the pump.

In the embodiment as illustrated in FIG. 4, the vehicle is equipped with five pairs of wheels, which are designated 39, 40, 41, 42 and 43. The by-pass valves between the pressure cylinder for the hydraulic suspension systems for adjacent pairs of wheels are designated as 44, 45, 46 and 47. The means for controlled damping in the hydraulic suspension system for wheels 40, 42 and 41, 43 are indicated by damping means 48, 49 and 50, 51, respectively. As illustrated, the suspension systems for two of the pairs of wheels 40 and 42 located nearest the front of the vehicle and the suspension systems for the two of the pairs of wheels 41, 43 located nearest the rear of the vehicle are each equipped with control damping means and spring means for each of the respective pairs of wheels. The suspension systems and control damping means for the inner pair 42 of the front two pairs of wheels and inner pair 43 of the rear two pairs of wheels may be selectively activated by additional circuitry in the control means 126 during extreme vehicle movements that exceed a predetermined amount of movement. The means for the controlled damping of the road wheels 42 and 43 would then be connected only in the case of sudden acceleration and braking. For this purpose an input like the dashed extension 3, FIG. 6 from the gyros or from separate accelerometers (not shown) to the member 90 would be used in the same way as for the criterion dependent activation of dampers 34 earlier described, only that two signal levels would be used for separate activation of dampers 48, 51 on the one hand and 49 and 50 on the other hand. However, in the present embodiment this selective activation should be considered as an optional feature not necessary for the basic function of the control damping system. A simple means of adding damping capacity to the capacity supplied by the dampers at the end wheel stations is to connect the dampers at stations 42 and 43 to the same circuitry as the end station dampers, to work in parallel with these. This could be done by a switch at the driver's station or be a permanent arrangement if acceptable in any specific application of the system.

The by-pass valves for diagonal 30 is designated as 52 in FIG. 4. The functions of the various parts illustrated in FIG. 4 correspond in principle to those described and illustrated in the embodiment illustrated in FIG. 2.

The by-pass valves shown in FIG. 4 are set in positions that would occur if the vehicle were tilted forward and towards the left. The pump 26 pumps in the direction shown by the arrow 53. In by-pass valve means 52, the valve 52a is closed, giving a flow direction according to the arrow 54 in diagonal 30'. In the by-pass valve 44–47 for the right side of the vehicle, the shut-off valves 44a, 45a, 46a and 47a are closed, giving a flow of the fluid medium toward the right and a flow of fluid medium in the diagonal 31' in the direction of arrow 55, assuming the diagonal 31 is declining towards the rear left. The flow of fluid through the diagonals 30' and 31' is accomplished in a manner similar to that illustrated in FIGS. 3a–3c previously described. The flow of fluid through valve means 44–47 also corresponds to the modes of operation previously described with respect to FIGS. 2 and 3a–3c.

In the by-pass and damping valves illustrated in the foregoing application, simple two position functions have been assumed, but it is of course possible to make some or all of the valves equipped with a continuously variable damping function.

The number of spring devices which need be equipped with means for controlling the damping of the downward movements of the vehicle can be determined by the magnitude of the driving, acceleration and braking movements to be encountered and the total number of road wheels used on the vehicle. Under normal driving conditions, only the outer wheels need to be damped, while in the case of sudden braking or acceleration, the inner pairs 42, 43 may also need to be damped.

Particularly for tracked vehicles, with the stabilizing functions previously described above, it is an advantage to have a certain amount of slack in the respective tracks. In order to prevent the tracks from slipping out of position, the track can also be provided for the wear protection means in such a way that does not make the track elastic.

The invention is not limited to the embodiments shown above for examples, but can be subject to modifications that fall within the scope of the accompanying claims. Thus, for instance, it is possible to connect together wheels and bogies with diagonal positioning on the vehicle as well as wheels and bogies along the longitudinal side of the vehicle. The number of pairs of wheels is not to be limited as shown, but can be assumed to vary from five or more pairs to six, seven or eight pairs of wheels.

I claim:

1. A system for stabilizing a vehicle on uneven terrain, said vehicle having a chassis and at least three pairs of wheels, each pair being independently mounted with respect to said chassis, said vehicle having a front and rear end;
   (a) means mounted on said vehicle chassis for generating a signal in response to tilting of said chassis as said vehicle traverses uneven terrain,
   (b) at least three fluid suspension systems mounted on said chassis with at least one system for each of said three pairs of wheels,
   said first and second systems being adjacent to each other and connected to function as a first bogie system,
   the second and third systems being adjacent to each other and connected to function as a second bogie system,
   said first and second suspension systems each having at least one valve means connecting an adjacent suspension system to permit bogie coaction between adjacent pairs of suspension systems when said valve means are opened,
   (c) control means for said valve means, said control means responsive to said signal generating means and said uneven terrain to selectively connect either the first and second suspensions of the vehicle or the second and third suspensions whereby bogie coaction results between said first and second pairs of wheels or said second and third pairs of wheels.

2. A system as claimed in claim 1 wherein a fluid medium is transferred between adjacent suspension systems during bogie coaction, said transfer being between first and second adjacent systems when said signal of a first polarity is generated, and between second and third adjacent systems when said signal of a second polarity is generated.

3. A system as claimed in claim 2 which includes fluid storage means provided for each suspension system and each set of wheels, said transfer between adjacent systems taking place between respective fluid storage means of each set of wheels.

4. A system as claimed in claim 1 wherein each of said wheels is mounted on a swing arm, said swing arm having a transducer means for sensing rotational movement of said swing arm.

5. A system as claimed in claim 4 wherein said control system compares the rotational movement determined by said transducer means with said signal generated in response to tilting of said chassis to selectively activate said bogie systems in response to uneven variations in said terrain.

6. A system as claimed in claim 1 or 2 wherein said means for generating said signal further comprises,
   (a) means for generating an angular position signal,
   (b) means for generating an angular velocity signal, and
   (c) means for combining said angular position signal and said angular velocity signal to produce an output signal indicative of a predetermined algebraic relationship between said angular velocity signal and said angular position signal.

7. A system as claimed in claim 1 wherein said vehicle further comprises:
   (a) a front swing arm on each side of the vehicle for mounting each of a wheel of a first of said sets of wheels at the front of the vehicle, (b) a rear swing arm on each side of the vehicle for mounting each wheel of a third set of said wheels at the rear of the vehicle; and (c) said control means being responsive to tilting of said vehicle chassis to effect:

(1) bogie coaction of said first and second suspension systems, mainly when said chassis front end relative to a reference plane, and said front or rear swing arms, in relation to the chassis front or rear end, respectively, are tilted in the same vertical direction, and, (2) bogie coaction of said second and third suspension systems when said chassis front end relative to a reference plane and said front or rear swing arm relative to said chassis front or rear end, respectively, are being tilted in opposite vertical directions.

8. A system as claimed in claim 1 wherein said vehicle further comprises:

(a) front swing arms between a first set of said wheels and the front of said vehicle, (b) rear swing arms between a third set of said wheels and the rear of said vehicle, (c) said control means responsive to tilting of said vehicle chassis to effect:

bogie coaction of said first and second suspension systems when said chassis and said front or rear swing arms are tilted in the same direction, bogie coaction of said second and third suspension systems when said chassis front end and said front or rear swing arms are tilted in opposite directions.

9. A system as claimed in claim 8 or 7 which further includes damping means and spring means for said first and third sets of wheels.

10. A system as claimed in claims 3, 8 or 7 in which said vehicle further comprises:

(a) five pairs of wheels with at least one separate suspension system for each of said pairs of wheels, (b) the suspension systems for two of said pairs located nearest the front end of the vehicle and the suspension systems for two of said pairs nearest the rear end of said vehicle having at least one damping and spring means for each pair of wheels, the inner pair of said front two pairs and the inner pair of said rear two pairs being selectively activated by said control means during extreme vehicle movements which exceed a predetermined amount.

11. A system for stabilizing a vehicle on uneven terrain, said vehicle having a chassis and at least three pairs of wheels, each wheel being independently mounted with respect to said chassis, said vehicle having a first and a second tilting axis, said vehicle also having a front and rear end and a first and second side, (a) first and second means for generating first and second signals, said first signal being generated in response to rotational motion around said first axis, and said second signals being generated in response to rotational motions around said second axis, (b) fluid suspension means for each of said wheels mounted between said wheels and said chassis, (c) first and second bogie conduit means mounted on said first and second sides of said vehicle to interconnect the suspension systems mounted on said first and second sides of the vehicle, respectively, each of said bogie conduits being equipped with a valve means to provide bogie coaction between adjacent wheels when said valve means are activated, (d) first and second diagonal conduit means interconnecting bogie conduit means diagonally across the vehicle, each of said diagonal conduit means having a pump means to transfer a fluid suspension medium from one bogie conduit means at one end of said vehicle to the other bogie conduit means at the opposite end of said vehicle, and (e) control means for selectively activating said pumps and said valve means in response to said first and said second signals as said vehicle traverses said uneven terrain.

12. A system as claimed in claim 11 wherein each of the pumps is paired with controllable by-pass valves, said by-pass valves being activated by said control means in response to said first and said second signals.

13. A system as claimed in claim 12 wherein control system provides at least four modes of flow for said fluid medium between said individual fluid suspension means;

(a) said first mode permitting a flow on either side of said vehicle only towards the front of said vehicle, (b) said second mode permitting a flow on either side of the vehicle only towards the rear end of said vehicle, (c) said third mode permitting free flow forward and rearward on either side of the vehicle, (d) said fourth mode preventing any flow forward or rearward on either side of the vehicle.

14. A system as claimed in claims 11, 12 or 13 wherein said control means provides selectible pump rates for transferring said fluid medium along said diagonal conduit means when said vehicle is inclined by said uneven terrain, said control means selecting a higher pump rate for the diagonal conduit means with the greatest inclination.

15. A system as claimed in claims 11, 12 or 13 wherein said control means provides selectable pumping rates for transferring said fluid medium along said diagonal conduit means when said vehicle is inclined by uneven terrain, said control means providing a higher pumping rate for the diagonal conduit means with the greatest inclination, said control means also providing a flow through the first and second bogie conduit means that follow the flow direction of the diagonal conduit means with the greatest inclination.

16. A system as claimed in claims 1, 2, 3, 4, 11, 12 or 13 wherein each of said valve means is further provided with a variable damping means.

17. A system as claimed in claims 11, 12 or 13 which further provides:

(a) means for generating a longitudinal and transverse angular position signals, (b) longitudinal and transverse gyro means for generating longitudinal and transverse angular velocity signals, (c) first and second means for generating a first output signal and a second output signal indicative of predetermined algebraic relationships between said angular position signals and said angular velocity signals.

18. A system as claimed in claim 11 wherein said control means selects the first or second mode of flow between said individual suspension systems when at least one of said diagonal conduit means is inclined, said control means selecting said first or second mode to follow the flow of the most inclined diagonal conduit.

19. A system as claimed in claims 11, 12 or 13 which further provides:

(a) means for generating two diagonal angular position signals, (b) means for generating two diagonal angular velocity signals,
(c) first and second means for generating a first output signal and a second output signal indicative of predetermined algebraic relationships between said angular position signals and said angular velocity signals.

20. In a vehicle having at least three pairs of wheels, a first of said pairs supported at the front of the vehicle, a third of said pairs supported at the rear of said vehicle, and a second pair of wheels supported between said first and third pairs of wheels; a system for stabilizing said vehicle while traversing uneven terrain comprising:

first, second, and third fluid operated suspension systems supporting said first, second and third pairs of wheels to said vehicle;

means for generating an output signal in response to said vehicle tipping while traversing said terrain;

first valve means connecting said first and second suspension systems whereby said first and second suspension systems upon operating said first valve means form a first bogie system;

a second valve means connecting said third suspension system with said second suspension system whereby said second and third suspensions upon operating said second valve means form a second bogie system; and control means for operating said first and second valve means, said control means connected to receive said output signal generated in response to said vehicle tipping, whereby said first and second systems are formed in response to said signal.

* * * * *